United States Patent [19]

Holzschuh

[11] Patent Number: 5,213,212

[45] Date of Patent: May 25, 1993

[54] MAGNETIC STABILIZATION OF SPOOLED FIBER OPTIC DATA LINKS

[75] Inventor: Jack E. Holzschuh, Kailua, Hi.

[73] Assignee: The United States of America as represented by the Secretary of the Navy, Washington, D.C.

[21] Appl. No.: 353,578

[22] Filed: May 18, 1989

[51] Int. Cl.⁵ ............................................. B65D 85/66
[52] U.S. Cl. .................................. 206/397; 242/118.4; 242/125.2; 242/155 M; 65/3.3; 310/93
[58] Field of Search .................... 206/397; 242/118.4, 242/125.2, 155 M; 65/3.3; 310/93

[56] References Cited

U.S. PATENT DOCUMENTS 2,281,204 4/1942 Raymond .
2,960,280 11/1960 Connelly et al. .
3,028,109 4/1962 Gottlub .
4,418,984 12/1983 Wysocki et al. ...................... 65/3.3
4,508,285 4/1985 McMillian .
4,516,739 5/1985 Wyatt ............................. 242/155 M
4,593,813 6/1986 Wright .

Primary Examiner—David Cain
Attorney, Agent, or Firm—Harvey Fendelman; Thomas Glenn Keough

[57] ABSTRACT

A ferromagnetic material on an optical fiber assures that the fiber is held in a proper position on a spool by a magnetic field. This stabilizes the optical fiber during winding to permit an automation of the spooling process and provides a constant force for holding the spooled optical fiber during storage. The constant and predictable holding force helps assure a constant and predictable peel force during deployment of the optical fiber.

10 Claims, 2 Drawing Sheets

MAGNETIC STABILIZATION OF SPOOLED FIBER OPTIC DATA LINKS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Optical fibers are being used more and more for communication and data gathering purposes and from all indications appear to be the broad-band data carrying link of the future. Deployment of the optical fibers from moving airborne, water craft or land vehicle platforms is becoming the accepted way to quickly establishing an optical data link. This mode of deployment has shown that spooled optical fibers inherently offer some advantages. Spooling of the fibers in certain coiled patterns on bobbin-like spindle structures or inside of cylindrically-shaped peripheral spools gives a high density fiber package and can serve as the support mechanism as a wound fiber is stripped away from the fiber spool during deployment of the fiber.

Typically, the optical fiber is held in a coiled, spooled-shape by an adhesive coating which is applied to the fiber prior to a precise winding and which hardens after a time when the fiber is wound. The adhesive is applied to stabilize the optical fiber pack both during and after spooling and to provide a peelforce resistance during deployment.

This precision spooling of the optical fiber is currently a slow, labor intensive process. The major reasons for this are the complications attended application of the adhesive on the fiber. The adhesives are difficult, if not nearly impossible, to be applied uniformly. This results in a variable peel force when the fiber is peeled from the spool. In addition even if it were possible to apply the adhesives uniformly, the physical characteristics of the adhesives during a high speed peel are not clearly established. That is to say, as varying peel rates are encountered, the force necessary to peel the fiber away is very likely to change. Another consideration is that long storage periods may further harden or soften the adhesive or change the adhesion properties on some adhesives so that the peel force, and, hence, the deployment characteristics of an optical fiber, might introduce kinking or other destructive consequences. Another limitation of adhesives is that some of them chemically react with the buffer materials on the optical fibers. This chemical reaction may change the adhesive's characteristics and ma tend to degrade the strength of the fiber.

Automation of the optical fiber spooling process is desirable from a cost effective standpoint. Automation promises faster spooling fabrication speeds and eliminates some of the drawbacks of a presently labor intensive fabrication procedure. However, the application of an adhesive still presents a major stumbling block to the automation of the optical fiber spooling procedure. From a number of indications, it is apparent that elimination of the adhesive from the precision spooling process stands to be a major step forward in fabricating coiled spools that are more suitable for the high speed deployment of optical fiber data links.

Thus, a continuing need exists in the state of the art for a method and means for improving the precision spooling of optical fibers by eliminating the adhesive from spooled optical fibers to assure a more reliable deployment of an optical fiber from a moving platform.

SUMMARY OF THE INVENTION

The present invention is directed to providing a method and means for improving the precision spooling of an optical fiber on a bobbin. A ferromagnetic material is suitably applied on the optical fiber prior to its being spooled. A bobbin for supporting spooled fiber is provided with a means for inducing a magnetic field. The magnetic field, acting on the ferromagnetic material on the optical fiber, magnetically holds the optical fiber in place as it is being coiled on the bobbin. This magnetic force stabilizes the optical fiber during winding and storage and assures that a constant and predicted peel force will be needed to pull the fiber from the spool as it is being deployed.

An object of the invention is to provide a method and means for holding an optical fiber in a precision spooled configuration during winding.

An object of the invention is to provide a method and means for maintaining an optical fiber in a precision spooled configuration during storage.

Another object of the invention is to provide a method and means for assuring a constant and predictable peel force as an optical fiber is being deployed.

Still another object of the invention is to provide a method and means for stabilizing an optical fiber in a spooled shape and for assuring a constant predictable peel force as the optical fiber is being deployed.

Another object is to provide a method and means for holding and maintaining an optical fiber in a spooled configuration without adhesives.

Yet another object of the invention is to provide a ferromagnetic material on an optical fiber and an induced magnetic field for stabilizing an optical fiber in a coiled configuration.

Yet another object of the invention is to provide a ferromagnetic material on an optical fiber that is maintained in a spooled configuration for assuring a constant predictable peel force as the fiber is being deployed.

Still yet another object of the invention is to provide a ferromagnetic material disposed on an optical fiber that is acted upon by a magnetic field to maintain the optical fiber in a spooled configuration for stabilizing the fiber and assuring a constant predictable peel force without the need for any adhesives.

These, other objects and the associated inherent advantages of this inventive concept will become more readily apparent from the ensuing specification and drawings when taken in conjunction with the appended claims.

DESCRIPTION OF THE PREFERRED EMBODIMENT

Figure 1:
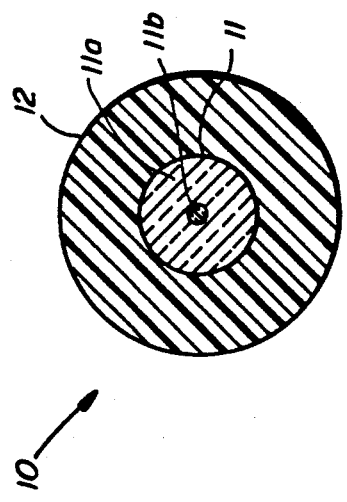
FIG. 1 is, a cross-sectional view of a typical optical fiber.

Referring now to FIG. 1 of the drawings, a contemporary optical fiber light guide 10 is shown that is typical of those being used for a multitude of optical data transmission tasks. A central portion 11 includes a cladding 11a and core 11b for guiding multi-mode or single-mode optical data and a buffer layer 12 is provided to afford a degree of protection. Fibers of this description have been widely used for some time although the buffer layer could be dispensed with for some applications, for example, to increase the length of a spooled optical fiber on a given spool; however, elimination of the buffer layer would sacrifice some of such a fiber's ruggedness.

Figure 2:
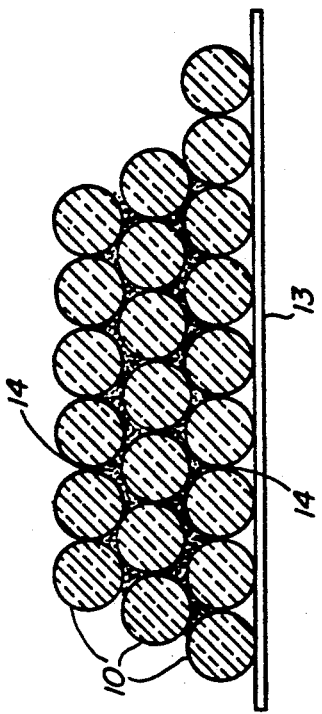
FIG. 2 shows a cross section of a typical spooled fiber conventionally held together by adhesive means.

Whichever specific configuration of the optical fiber is chosen, the optical fibers 10 usually are spooled on a bobbin 13 which has a spindle-shaped configuration to support a fiber around the spindle or a cylindrical shell-shaped configuration to support a fiber on the inside of the shell, see FIG. 2. The optical fiber is spooled on the bobbin using an established precision wind that is secured by an adhesive 14. This structure is hoped to allow a trouble-free pay out of the coiled fiber.

The adhesive has been applied to perform critical functions. The adhesive stabilizes the fiber spool during winding and against environmental changes during long-term storage and use. It also is included to hopefully provide a predictable and uniform peel force resistance to assure that the optical fiber will pay out successfully when it is deployed. Unfortunately, the adhesives do not always meet the expectations.

Figure 3:
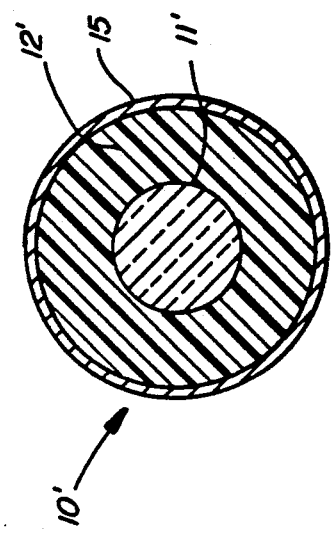
FIG. 3 is a cross-section depiction of a fiber having a ferromagnetic material applied thereto.

Referring now to FIG. 3, in accordance with this inventive concept, optical fiber 10' having an optical portion 11' and buffer portion 12' is provided with a ferromagnetic material 15. The ferromagnetic material selected may be any one of a number of commercially available ferromagnetic liquids or ferrite suspensions. Some of these are iron-based or iron or nickel alloys and may be non-conducting if desired. The property of the selected materials relied upon in the realization of this inventive concept is the characteristic of being influenced or attracted to be held by a magnetic field.

The ferromagnetic materials may be applied to the outside of buffer 12' by a number of established means. For example, the ferromagnetic material can be a suspension of particles in a suitable binder that is coated on the outside of the fiber or the particles could be applied by a deposition process such as the chemical vapor deposition process in a continuation of the fiber fabrication procedure. Other application processes will suggest themselves to those skilled in the art to which this invention pertains.

Figure 4:
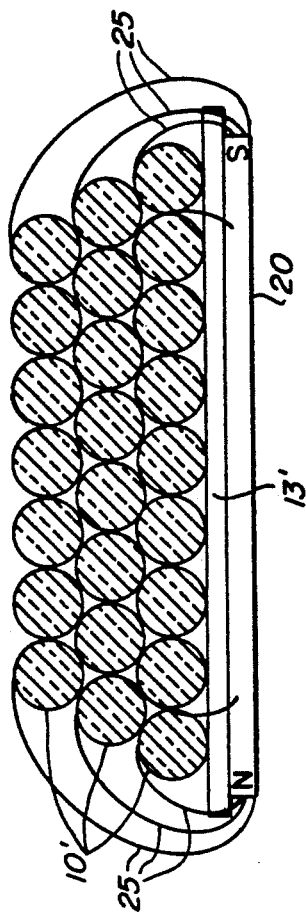
FIG. 4 shows a cross section of an optical fiber provided with a ferromagnetic material that is spooled on a bobbin and which portrays the lines of magnetic flux associated with part of a suitable magnetic flux source.

Referring now to FIG. 4 an optical fiber 10' having the ferromagnetic material is wound in a spooled configuration on a bobbin 13' in accordance with a conventional winding or spooling procedures. The bobbin is provided with a suitable magnetic field source 20 that induces lines of magnetic flux 25 between its north and south poles. Although the source is depicted as being a single unit, such units are provided throughout the inside circumference of the bobbin so that an essentially cylindrically-shaped array of side-by-side magnetic field source units are presented to induce magnetic lines of flux that influence the entire spooled fiber.

The ferromagnetic material on fiber 10' is acted upon by the magnetic field and become aligned therewith to hold the optical fiber 10' in the spooled configuration on the bobbin. A mutual adhering or bonding force is created by the magnetic field with the ferromagnetic material associated with the layers of windings of optical fiber 10'.

This mutual attractive force holds the fiber in place and provides a holding force that is a function of the amount and constituency of the ferromagnetic material applied and the magnitude of the magnetic field induced by the magnetic field source 20. This mutual attracting force can be established to a desired magnitude by the proper selection of these parameters so that a proper peel force from the spool can be pre-established in accordance with a desired optical fiber deployment scheme.

In other words, the magnetic flux generated by the magnetic flux source carried on the spool couples to the ferromagnetic material on the optical fiber creating a magnetic force that attracts the fiber both toward the magnetic source and itself. This magnetic force effectively bonds the fiber to the bobbin. The magnitude of this bonding force can be controlled by the thickness of the ferromagnetic coating on the fiber, the permeability of the ferromagnetic coating on the fiber and the flux density of the magnetic field.

The magnetic source which creates the magnetic field may be a plurality of aligned permanent magnets disposed in a juxtaposed relationship on the inside of a spindle that supports a coiled fiber or the outside of a cylindrically-shaped bobbin having the optical fiber spooled inside. Optionally, the magnets could be configured in a radially outwardly pattern on one side of a disk-shaped bobbin. In such a configuration, the fiber having the ferromagnetic material could be wound in stacked radially outward and radially inward patterns and be held in an essentially stacked cylindrical shape made u of disk-shaped winding layers by the magnetic field.

The magnetic field source also could be a well known electromagnetic arrangement suitably designed and disposed as described above to provide a relatively constant magnetic field throughout the thickness of the spooled optical fiber. In either case of a number of magnets or electromagnets, the magnetic field induced can be adjusted by routine materials or component selection to provide a desired securing force that is suitable for a particular application.

Figure 5A:
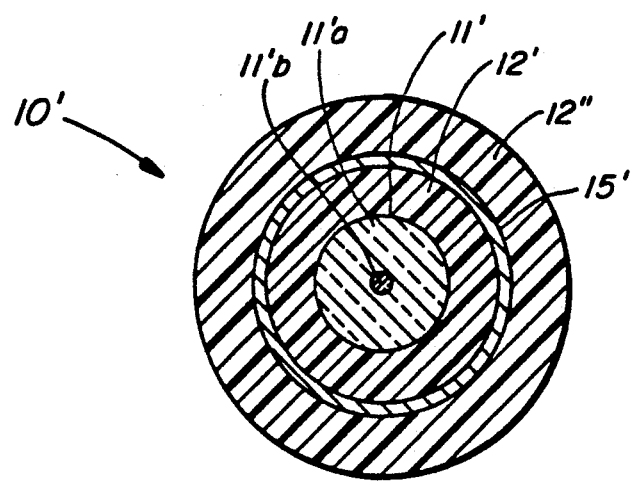
FIG. 5A shows a modified optical fiber with the ferromagnetic, magnetic material.
Figure 5B:
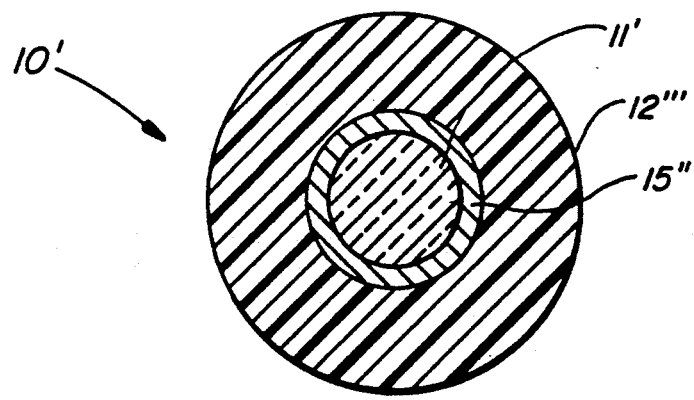
FIG. 5B shows an alternate application of the ferromagnetic, magnetic material on an optical fiber.

The ferromagnetic material, optionally, can be disposed on an optical fiber as shown in FIGS. 5A and 5B. Noting FIG. 5A, fiber 10' has an optical fiber portion 11' surrounded by a buffer layer 12' with a ferromagnetic material 15' disposed on the buffer layer. Another buffer layer 12" is provided outwardly of the buffer layer to protect the ferromagnetic material layer from abrasion or interaction with the ambient. The embodiment of FIG. 5B has a ferromagnetic material layer 15" located on an optical fiber portion 11' and a buffer layer 12''' is disposed outwardly of the ferromagnetic material. In the embodiment of FIG. 5B the buffer layer may be dispensed with entirely, such as, for example, where a high density of a spooled optical fiber is desired although this configuration would have less resistance to the ambient deleterious effects which have come to be commonplace where optical fibers of this type are to be deployed. Other combinations of layered ferromagnetic materials and other cable components are obviously foreseeable having this disclosure in mind.

Obviously, many modifications and variations of the present invention are possible in the light of the above teachings. It is therefore to be understood that within the scope of the appended claims the invention may be practiced otherwise than as specifically described.

I claim:

1. A spooled optical fiber for transmitting optical data through an optical transmitting portion comprising:
    means for supporting said optical fiber in a spooled configuration thereon;
    means mounted on said supporting means for inducing a magnetic flux encompassing said spooled configuration of said optical fiber; and
    means disposed outside of said optical transmitting portion of said optical fiber for magnetically coupling to said magnetic flux to hold said optical fiber in said spooled configuration.

2. A spooled optical fiber according to claim 1 in which said magnetically coupling means is a ferromagnetic material.

3. A spooled optical fiber according to claim 2 in which said ferromagnetic material is disposed in a cylindrical layer outside said optical transmitting portion of said optical fiber.

4. A spooled optical fiber according to claim 3 in which said supporting means is a bobbin having a surface for the winding of said spooled configuration of said optical fiber thereon.

5. A spooled optical fiber according to claim 4 in which said inducing means is a plurality of magnets configured in a side-by-side cylindrical shell-shaped arrangement near said surface of said bobbin.

6. A spooled optical fiber according to claim 4 in which said inducing means is at least one electromagnet near said surface of said bobbin.

7. A method of creating a spooled configuration of an optical fiber on a bobbin comprising:
    applying a ferromagnetic material along the length of said optical fiber prior to said spooled configuration;
    providing a source of magnetic flux so that the flux encompasses said spooled configuration of, said optical fiber on said bobbin;
    winding said optical fiber in said spooled configuration on said bobbin; and
    magnetically holding said optical fiber in said spooled configuration by the action of said magnetic flux on said ferromagnetic material.

8. A method according to claim 7 in which the step of providing includes arranging a plurality of magnets so that their magnetic flux encompasses said spooled configuration.

9. A method according to claim 8 in which the step of providing includes locating at least one electromagnet so that the flux encompasses said spooled configuration.

10. A method for assuring the stability of an optical fiber wound on a bobbin and held thereon with a predetermined force to assure a predictable peel force therefrom comprising:
    applying a ferromagnetic material along the length of said optical fiber;
    providing a source of magnetic flux in a manner such that the flux encompasses said optical fiber that is wound on said bobbin;
    winding of said optical fiber in a predetermined pattern on said bobbin; and
    magnetically holding said optical fiber in said predetermined pattern on said bobbin with said predetermined force to assure said predictable peel force.

* * * * *